May 15, 1962
A. SCHMIDT ET AL
3,034,853
PROCESS FOR THE REMOVAL OF LOWER OXIDES
OF NITROGEN FROM GASEOUS MIXTURES
CONTAINING THEM
Filed Aug. 4, 1959
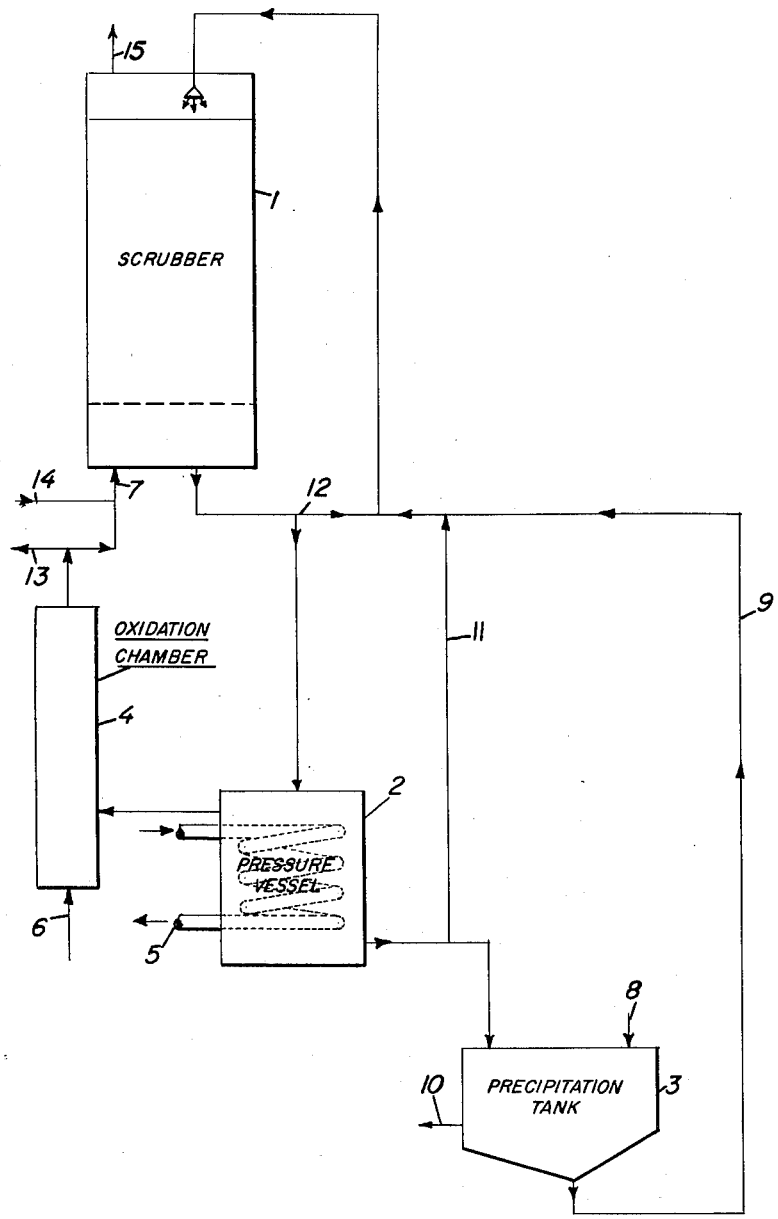
INVENTORS
*Alfred Schmidt &
Ferdinand Weinrotter*
BY *Wenderoth, Lind & Ponack*
ATTORNEYS

United States Patent Office 3,034,853
Patented May 15, 1962

3,034,853
PROCESS FOR THE REMOVAL OF LOWER OXIDES OF NITROGEN FROM GASEOUS MIXTURES CONTAINING THEM
Alfred Schmidt and Ferdinand Weinrotter, Linz, Austria, assignors to Osterreichische Stickstoffwerke Aktiengesellschaft, Linz, Austria
Filed Aug. 4, 1959, Ser. No. 831,614
12 Claims. (Cl. 23—2)

The lower oxides of nitrogen (NO and $NO_2$) contained in the waste gases emerging from nitric acid producing plant are a nuisance and their removal is frequently desirable.

Moreover, the lower nitrogen oxides in the waste gases represent a production loss of nitric acid, which may be of considerable financial significance. Hitherto, alkaline liquors have been used for absorbing these lower oxides, chiefly, solutions of soda and suspensions of calcium hydroxide were used.

When using soda solutions for absorbing the nitrogen oxides ($N_2O_3$) sodium nitrite is formed which is either recovered as such or converted into sodium nitrate by treating it with nitric acid.

The use of calcium hydroxide calls for a special mode of operation because basic calcium nitrite is readily formed and this tends to choke the washing apparatus (usually a scrubbing tower). It is therefore necessary to maintain the nitric content of the scrubbing liquor at as low a level as possible. The final product of the process is calcium nitrate which, owing to its hygroscopic nature, may have to be submitted to further processing to transform it into commercially valuable products.

None of the processes so far known permits the scrubbed or absorbed lower nitrogen oxides to be recovered as such from the waste gases. The process which will be hereinafter described permits two thirds of the lower oxides of nitrogen contained in the waste gases from nitric acid plant to be recovered and put to use as such.

There is provided by the present invention a process for removal of nitric oxide and nitrogen dioxide from a gaseous mixture containing them, which process includes the steps of reacting the oxides of nitrogen with magnesium hydroxide and/or magnesium carbonate in aqueous suspension to form magnesium nitrite by passing said gaseous mixture into said aqueous suspension, and, thereafter, heating said aqueous suspension to cause decomposition of said magnesium nitrite and formation of nitric oxide, magnesium hydroxide and magnesium nitrate with consequent evolution of nitric oxide, precipitation of the magnesium hydroxide and dissolution of the magnesium nitrate thus formed.

Magnesium hydroxide and carbonate bind the nitrous oxide, forming magnesium nitrite. The latter is decomposed into magnesium nitrate, magnesium hydroxide, and nitric oxide, according to the formula

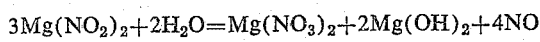
$3Mg(NO_2)_2 + 2H_2O = Mg(NO_3)_2 + 2Mg(OH)_2 + 4NO$ by heating the washing liquor in a pressure vessel to temperatures preferably between 140 to 200° C. Preferably, the pressure vessel is indirectly heated with steam.

The NO evolved in the pressure-decomposing vessel is decompressed sufficiently to ensure that the pressure does not exceed 3 to 6 ats. gauge. The concentration of the washing liquor is maintained at between 200 and 300 g./litre of magnesium nitrite by diluting it. The quantity of solids dispersed in the liquor should preferably not exceed 20%. The nearly pure NO liberated by the decomposition of the magnesium nitrite liquor is used as such, or after re-oxidation with air or oxygen, in any manner that may be desirable. It may commend itself to return the re-oxidised nitric oxide to the nitric acid process.

The magnesium hydroxide formed by the pressure decomposition of the magnesium nitrite after scrubbing appears in the form of a crystalline precipitate which can be filtered and returned to the absorption cycle. The filtrate contains magnesium nitrate which can be put to any convenient use. However, it has been found that a simultaneous content of alkali or alkaline earth metal nitrate in the washing liquor considerably reduces the temperature required for decomposing the magnesium nitrite. It is therefore advisable to reintroduce a portion of the magnesium nitrate obtained in the decomposition process into the recycled washing liquor to ensure that the latter will contain the quantity required for temperature reduction when the washing liquor is heated in the pressure vessel.

However, a better method is to keep all the magnesium in the used washing liquor in the cycle. If this is done, the suspension of magnesium hydroxide in the magnesium nitrate liquor which has been produced by the pressure decomposition of the used washing liquor, with the exception of the above mentioned portion, is transformed, in a manner known as such, for instance by treating it with alkali or alkaline earth metal carbonates, and even more conveniently with gaseous ammonia and carbon dioxide, into a mixture of magnesium hydroxide, magnesium carbonate, and basic magnesium carbonate, which can be returned to the absorption cycle after separation of the mother liquor containing the ammonium nitrate or alkali or alkaline earth metal nitrates, that has been formed.

The process of scrubbing the waste gases containing the lower oxides of nitrogen is performed in countercurrent in a scrubbing tower of conventional kind employing the described washing liquor, or in any other known type of washing apparatus.

To ensure that the absorption of the lower nitrogen oxides in the scrubber will be as quantitative as possible, the known properties of nitrogen oxides necessitate that the $N_2O_3$ content in the mixture should be raised to as high a level as possible, because NO is not absorbed at all, and $NO_2$ leads to the formation of magnesium nitrate which is undesirable in the present process. Therefore, according to the degree of oxidation of the lower nitrogen oxide mixture, either a portion of the NO formed during the pressure decomposition of the washing liquor is metered back unchanged, or it is oxidised to $NO_2$ in known manner with air or oxygen and then introduced into the waste gas containing the lower nitrogen oxides, as it enters the bottom of the scrubbing tower, in quantities that will ensure that the nitrogen oxide mixture which is to be absorbed in the tower consists as nearly as possible exclusively of $N_2O_3$. The washing liquor suspension according to the invention binds this oxide practically completely in the form of magnesium nitrite which, during the subsequent pressure decomposition followed by alkalisation, will then given an optimum yield of those magnesium compounds which have proved themselves to be most suitable for binding the lower nitrogen oxides.

The process according to the invention, therefore, permits the lower nitrogen oxides in the waste gases to be recovered in a practically loss-free cyclic process, using cheap absorbents principally in a form which can be directly processed into nitric acid. The advantage of the process consists in that no final products which are difficult to sell, and no intermediate products are formed which tend to endanger and choke up the apparatus. An apparatus which is especially suitable for performing the process according to the invention is illustratively shown in the accompanying drawing. In the drawing, reference numeral 1 represents a conventional type of equipment for washing a gas, in which the lower nitrogen oxides are reacted in countercurrent with the aqueous magnesium nitrate liquor containing magnesium hydroxide, and possibly also magnesium carbonate and basic magnesium carbonate in suspension. The washing liquor which then contains magnesium nitrite, is discharged into a pressure vessel 2 where the magnesium nitrite in the liquor is converted into magnesium nitrate and magnesium hydroxide. This vessel 2 is conveniently heated by pressurized steam conducted through coils 5. The liberated nitric oxide is decompressed in an oxidation chamber 4 where it is mixed at 6 with air or oxygen, and is then returned either through 13 to the so-called acid absorption process of the nitric acid plant or, at 7, partly into the scrubber 1 for correcting the composition of the nitrogen oxide mixture. The suspension of crystalline magnesium hydroxide in magnesium nitrate liquor formed in the decomposition vessel 2 is either separated off and the magnesium nitrate liquor is treated separately, or it is treated together with the hydroxide in the following precipitation tank 3 with alkaline soltuions or gaseous ammonia and carbon dioxide from 8, whereby the magnesium hydroxide remains unchanged, while the magnesium nitrate is transformed into magnesium hydroxide, carbonate and basic carbonate. This precipitation mixture is taken from 3 through a return pipe 9 back to the scrubber 1, the nitrate liquor formed having been separated off at 10. Provision is also made for alternatively returning decomposition mixture through 11 directly from the pressure vessel 2 and/or for recirculating unused washing liquor from 1 through 12 back into the scrubbing tower. 14 is the admission for fresh gas and 15 the outlet for the exhaust gas.

The described process differs in important respects from a known proces for the absorption of nitrogen oxides from waste gases by means of milk of lime in which the resultant calcium nitrite is converted into nitrate by nitric acid and the nitrate is then used as absorbent for the nitrogen oxides.

*Examples*

(1) 100,000 N cu. m./h. of waste gas with 5.5 g./cu. m. NO and 2.5 g./cu. m. $NO_2$ will be washed with 1200 cu. m./h of alkaline solution in two parallel absorption towers with a height of 27 m. and a diameter of 8 m., filled with Raschig-rings with a diameter of 70 mm. and a height of 80 mm. In the alkaline solution, 120 kg./cu. m. of MgO in the form of $Mg(OH)_2$ or $MgCO_3.3H_2O$ are suspended.

According to the quantity of nitrogen which was absorbed from the washing alkaline solution as nitrous gases 1.88 cu. m./h. were deducted. This alkaline solution contains 250 g./l. $Mg(NO_2)_2$ and 20 g./l. $Mg(NO_3)_2$ dissolved.

This quantity of alkaline solution together with the solids suspended therein ($Mg(OH)_2$ and $MgCO_3.3H_2O$, respectively) will be heated for one hour on the reflux at a temperature of 145° C. and 4 atü. (atmospheres above atmospheric pressure), whereby 161 kg. NO escape. The expanded, cooled alkaline solution will be filtered from 108 kg. of MgO as newly formed $Mg(OH)_2$, and from 236 kg. of MgO as suspended unused remained $Mg(OH)_2$ and $MgCO_3.3H_2O$. The mother-liquor contains 238 kg. $Mg(NO_3)_2$ dissolved. It will be reacted, cooled, and filtered with 170 kg. $Na_2CO_3$ at a temperature of 120° C. and 1.5 atü. The filtrate contains 272 kg. $NaNO_3$ which can be obtained by evaporation. The filtered Mg-carbonate-hydrate, approx. 220 kg., will be returned to the absorption.

(2) 100,000 N cu. m./h. of waste gas with 5.5 g./N cu. m. NO and 2.5 g./N cu. m. $NO_2$ will be mixed with 595 kg./h. of $NO_2$ which are obtained in the further process. This mixture will be washed in the cycle in two parallel absorption towers with 1200 cu. m./h. of alkaline solution, which contains 120 kg./cu. m. MgO as suspended $Mg(OH)_2$, similar to Example 1. Every hour 6.44 cu. m. of alkaline solution with 250 g./l. $Mg(NO_2)_2$ and 20 g./l. $Mg(NO_3)_2$ are deducted.

This alkaline solution together with the solids suspended therein will be heated during the reflux at a temperature of 140° C. and 4 atü for one hour, whereby 555 kg. NO escape. 388 kg. NO will be oxidized by adding air to 595 kg. $NO_2$ under cooling, and returned to the absorption, the rest may be used as pleased. From the decomposed alkaline solution 535 kg. newly formed and 1075 kg. having been suspended, during the absorption unused remained $Mg(OH)_2$ will be filtered and returned to the absorption; 810 kg. $Mg(NO_3)_2$ remain in solution, which can be used further as pleased.

What we claim is:

1. A process for removing nitric oxide and nitrogen dioxide from a gaseous mixture containing the same, comprising passing said gaseous mixture through an aqueous alkaline-reacting suspension containing at least one member selected from the group consisting of magnesium hydroxide, magnesium carbonate and basic magnesium carbonate, thereby reacting the nitrogen oxides of said gaseous mixture with the magnesium compound in said aqueous suspension and thus forming magnesium nitrite, heating the resulting magnesium nitrite-containing suspension under pressure, thereby decomposing the magnesium nitrite with formation of gaseous nitric oxide, magnesium hydroxide and magnesium nitrate, and separating the nitric oxide from the resulting suspension of precipitated magnesium hydroxide in magnesium nitrate solution.

2. A process for removing nitric oxide and nitrogen dioxide from a gaseous mixture containing the same, comprising passing said gaseous mixture through an aqueous alkaline-reacting suspension containing at least one member selected from the group consisting of magnesium hydroxide, magnesium carbonate, and basic magnesium carbonate, thereby reacting the nitrogen oxides of said gaseous mixture with the magnesium compound in said aqueous suspension and thus forming magnesium nitrite, heating the resulting magnesium nitrite-containing suspension under pressure, thereby decomposing the magnesium nitrite with formation of gaseous nitric oxide, magnesium hydroxide and magnesium nitrate, separating the nitric oxide from the resulting suspension of precipitated magnesium hydroxide in magnesium nitrate solution, and reacting the separated nitric oxide with a gaseous, free oxygen-containing oxidizing agent to obtain nitrogen dioxide therefrom.

3. A process for removing nitric oxide and nitrogen dioxide from a gaseous mixture containing the same, comprising passing said gaseous mixture through an aqueous alkaline-reacting suspension containing at least one member selected from the group consisting of magnesium hydroxide, magnesium carbonate and basic magnesium carbonate, thereby reacting the nitrogen oxides of said gaseous mixture with the magnesium compound in said aqueous suspension and thus forming magnesium nitrite, heating the resulting magnesium nitrite-containing suspension under pressure, thereby decomposing the magnesium nitrite with formation of gaseous nitric oxide, magnesium hydroxide and magnesium nitrate, separating the nitric oxide from the resulting suspension of precipitated magnesium hydroxide in magnesium nitrate solution, reacting the separated nitric oxide with a gaseous, free oxygen-containing oxidizing agent to obtain nitrogen dioxide therefrom, and introducing the obtained nitrogen dioxide into said gaseous mixture, prior to passing the latter through said aqueous suspension, in such amount as to form in the said gaseous mixture a nitrogen oxide composition of substantially exclusively $N_2O_3$.

4. The process as described in claim 3, wherein said gaseous, free oxygen-containing oxidizing agent is selected from the group consisting of air and oxygen.

5. A process for removing nitric oxide and nitrogen dioxide from a gaseous mixture containing the same, comprising passing said gaseous mixture through an aqueous alkaline-reacting suspension containing at least one member selected from the group consisting of magnesium hydroxide, magnesium carbonate, and basic magnesium carbonate, thereby reacting the nitrogen oxides of said gaseous mixture with the magnesium compound in said aqueous suspension and thus forming magnesium nitrite, heating the resulting magnesium nitrite-containing suspension under pressure while diluting the same to a concentration of from about 200 to 300 grams of magnesium nitrite per liter of suspension, thereby decomposing the magnesium nitrite with formation of gaseous nitric oxide, magnesium hydroxide and magnesium nitrate, and separating the nitric oxide from the resulting suspension of precipitated magnesium hydroxide in magnesium nitrate solution.

6. A process for removing nitric oxide and nitrogen dioxide from a gaseous mixture containing the same, comprising passing said gaseous mixture through an aqueous alkaline-reacting suspension containing at least one member selected from the group consisting of magnesium hydroxide, magnesium carbonate and basic magnesium carbonate, thereby reacting the nitrogen oxides of said gaseous mixture with the magnesium compound in said aqueous suspension and thus forming magnesium nitrite, heating the resulting magnesium nitrite-containing suspension to a temperature of about 140 to 200° C. under a pressure of about 3 to 6 atmospheres, thereby decomposing the magnesium nitrite with formation of gaseous nitric oxide, magnesium hydroxide and magnesium nitrate, and separating the nitric oxide from the resulting suspension of precipitated magnesium hydroxide in magnesium nitrate solution.

7. A process for removing nitric oxide and nitrogen dioxide from a gaseous mixture containing the same, comprising passing said gaseous mixture through an aqueous alkaline-reacting suspension containing at least one member selected from the group consisting of magnesium hydroxide, magnesium carbonate, and basic magnesium carbonate, and further containing dissolved a nitrate selected from the group consisting of alkali metal nitrate and alkaline earth metal nitrate, thereby reacting the nitrogen oxides of said gaseous mixture with the magnesium compound in said aqueous suspension and thus forming magnesium nitrite, heating the resulting magnesium nitrite-containing suspension under pressure, thereby decomposing the magnesium nitrite with formation of gaseous nitric oxide, magnesium hydroxide and magnesium nitrate, and separating the nitric oxide from the resulting suspension of precipitated magnesium hydroxide in magnesium nitrate solution.

8. The process described in claim 7, wherein the dissolved nitrate is magnesium nitrate.

9. A process for removing nitric oxide and nitrogen dioxide from a gaseous mixture containing the same, comprising passing said gaseous mixture through an aqueous alkaline-reacting suspension containing at least one member selected from the group consisting of magnesium hydroxide, magnesium carbonate and basic magnesium carbonate, thereby reacting the nitrogen oxides of said gaseous mixture with the magnesium compound in said aqueous suspension and thus forming magnesium nitrite, heating the resulting nitrite-containing suspension under pressure, thereby decomposing the magnesium nitrite with formation of gaseous nitric oxide, magnesium hydroxide and magnesium nitrate, and separating the nitric oxide from the resulting suspension of precipitated magnesium hydroxide in magnesium nitrate solution, adding to the latter suspension an agent reacting as a base and being selected from the group consisting of alkali metal carbonate, alkaline earth metal carbonate, and a mixture of gaseous ammonia and carbon dioxide reacting as a base in said magnesium hydroxide suspension, thereby forming the corresponding nitrate and magnesium carbonate in said suspension, and separating the last mentioned nitrate from said magnesium carbonate and said precipitated magnesium hydroxide.

10. A process for removing nitric oxide and nitrogen dioxide from a gaseous mixture containing the same, comprising passing said gaseous mixture through an aqueous alkaline-reacting suspension containing at least one member selected from the group consisting of magnesium hydroxide, magnesium carbonate and basic magnesium carbonate, thereby reacting the nitrogen oxides of said gaseous mixture with the magnesium compound in said aqueous suspension and thus forming magnesium nitrite, heating the resulting magnesium nitrite-containing suspension under pressure, thereby decomposing the magnesium nitrite with formation of gaseous nitric oxide, magnesium hydroxide and magnesium nitrate, and separating the nitric oxide from the resulting suspension of precipitated magnesium hydroxide is magnesium nitrate solution, adding to the latter suspension an agent reacting as a base and being selected from the group consisting of alkali metal carbonate, alkaline earth metal carbonate, and a mixture of gaseous ammonia and carbon dioxide reacting as a base in said magnesium hydroxide suspension, thereby forming the corresponding nitrate and magnesium carbonate in said suspension, and separating the last-mentioned nitrate from said magnesium carbonate and said precipitated magnesium hydroxide and adding the latter two substances to the aqueous alkaline-reacting suspension.

11. A process for continuously removing nitric oxide and nitrogen dioxide from a gaseous mixture containing the same, comprising continuously passing said gaseous mixture through an aqueous alkaline-reacting suspension containing at least one member selected from the group consisting of magnesium hydroxide, magnesium carbonate, basic magnesium carbonate and mixtures thereof, and further containing dissolved a nitrate selected from the group consisting of alkali metal nitrate and alkaline earth metal nitrate, thereby reacting the nitrogen oxides of said gaseous mixture with the magnesium compound in said aqueous suspension and thus forming preponderantly magnesium nitrite and only a minor portion of magnesium nitrate, withdrawing continuously magnesium-nitrite-and-nitrate-containing suspension and diluting the latter so as to maintain therein a concentration of from about 200 to 300 grams of magnesium nitrite per liter of suspension, heating the resulting diluted suspension to a temperature of about 140 to 200° C. under a pressure of about 3 to 6 atmospheres, thereby decomposing the magnesium nitrite in said suspension with formation of gaseous nitric oxide, magnesium hydroxide and magnesium nitrate, separating the nitric oxide from the resulting suspension of precipitated magnesium hydroxide in magnesium nitrate solution, reacting part of the separated nitric oxide with an oxidizing agent selected from the group consisting of air and oxygen to form nitrogen dioxide, admixing with said gaseous mixture prior to its passage through said aqueous alkaline-reacting suspension one of the members of the group consisting of the unreacted part of said separated nitric oxide and said formed nitrogen dioxide in such amounts as to form in said gaseous mixture a nitrogen oxide composition of substantially exclusively $N_2O_3$, and adding the suspension of precipitated magnesium hydroxide in magnesium nitrate solution to the said alkaline-reacting suspension.

12. A process for removing nitric oxide and nitrogen dioxide from a gaseous mixture containing the same, comprising passing said gaseous mixture through an aqueous alkaline-reacting suspension containing at least one member selected from the group consisting of magnesium hydroxide, magnesium carbonate and basic magnesium carbonate, thereby reacting the nitrogen oxides of said gaseous mixture with the magnesium compound in said aqueous suspension and thus forming magnesium nitrite, heating the resulting magnesium nitrite-containing suspension under pressure, thereby decomposing the magnesium nitrite with formation of gaseous nitric oxide, magnesium hydroxide and magnesium nitrate, and separating the nitric oxide from the resulting suspension of precipitated magnesium hydroxide in magnesium nitrate solution, adding to the latter suspension gaseous ammonia and carbon dioxide, thereby forming ammonium nitrate and magnesium carbonate in said suspension, and separating the last-mentioned nitrate from said magnesium carbonate and said precipitated magnesium hydroxide and adding the latter two substances to the aqueous alkaline-reacting suspension.

References Cited in the file of this patent

UNITED STATES PATENTS

| | | |
|---|---|---|
| 1,029,528 | Bosch et al. | June 11, 1912 |
| 1,070,070 | Rothe | Aug. 12, 1913 |
| 1,110,481 | Collett | Sept. 15, 1914 |
| 2,155,853 | Anthony | Apr. 25, 1939 |

FOREIGN PATENTS

| | | |
|---|---|---|
| 3,036 of 1868 | Great Britain | Feb. 2, 1869 |
| 16,068 of 1907 | Great Britain | July 9, 1908 |

OTHER REFERENCES

Jacobson: "Encyclopedia of Chemical Reaction," Reinhold Publishing Co., New York, vol. 4, 1951, pages 435 and 440.